United States Patent Office 3,195,303
Patented July 20, 1965

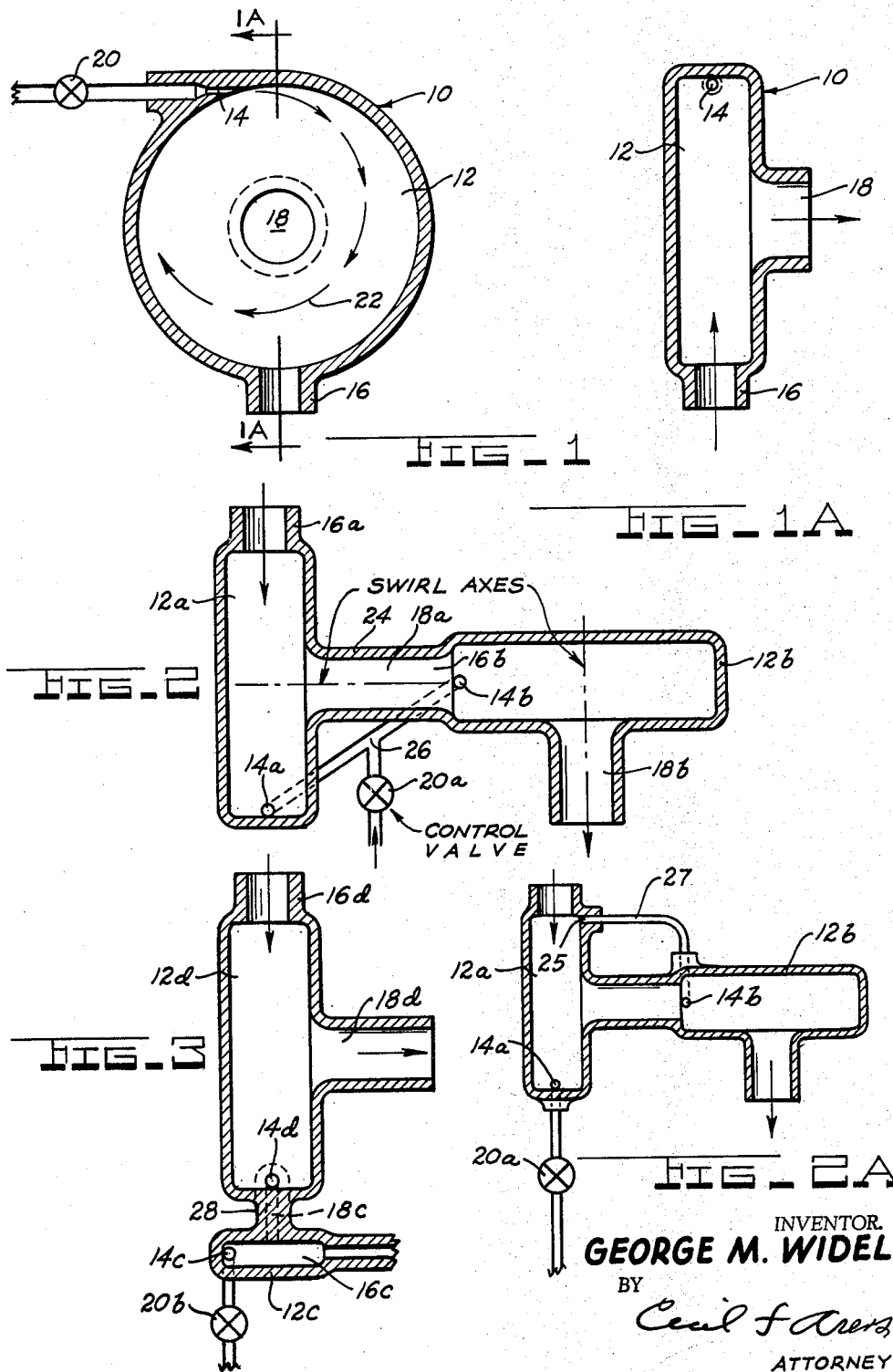

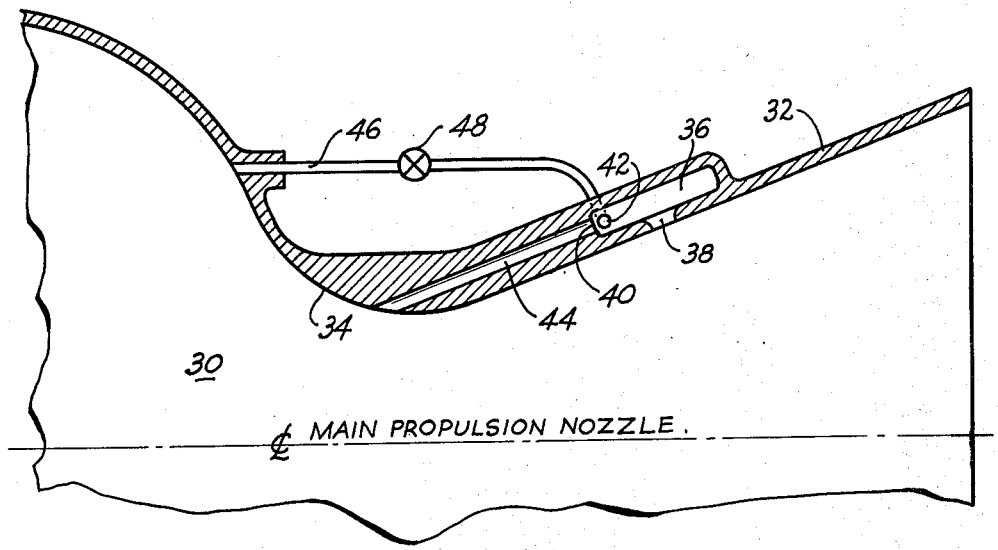
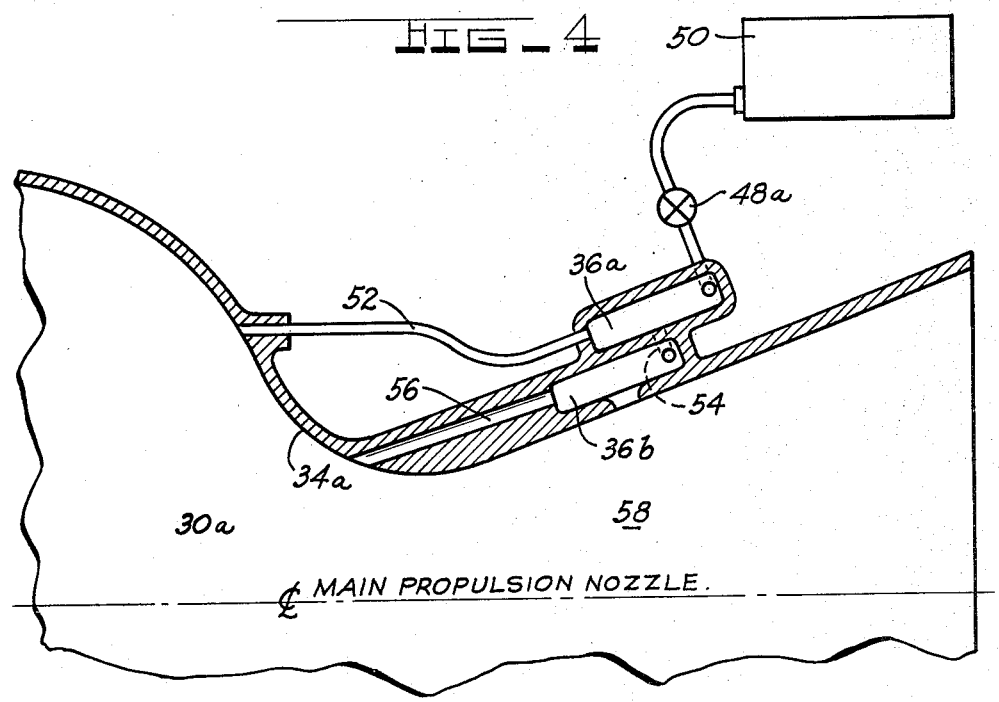

3,195,303
VORTEX VALVE
George M. Widell, South Bend, Ind., assignor to The
Bendix Corporation, South Bend, Ind., a corporation
of Delaware
Filed Jan. 22, 1962, Ser. No. 167,727
8 Claims. (Cl. 60—35.54)

This invention relates to a flow regulating device.

It is an object of this invention to control a main flow by a swirling flow.

It is another object of this invention to combine at least two swirl chambers to control a high velocity, high temperature flow.

An additional object is to combine two swirl chambers in such a manner as to increase the range of control afforded by said swirl chambers.

A further object is to control a thrust vector flow by a swirl chamber device.

A still further object is to control the use of combustion gases as a thrust vector control.

Other and further objects of this invention will be readily appreciated from the following specification and drawings in which:

FIGURE 1 is a front sectional view of a swirl chamber according to this invention;

FIGURE 1A is a sectional side view of the swirl chamber of FIGURE 1 according to this invention;

FIGURE 2 is a side sectional view of a combination of swirl chambers according to this invention;

FIGURE 2A is a sectional side view of a combination of swirl chambers as presented by FIGURE 2 but modified according to this invention;

FIGURE 3 is a side sectional view of another combination of swirl chambers according to this invention;

FIGURE 4 is a sectional view of a rocket nozzle having a swirl chamber thrust vector control according to this invention; and FIGURE 5 is a sectional view of a rocket nozzle having a combination of swirl chambers according to the present invention to regulate thrust vector control flow.

With more particular regard to the figures, FIGURE 1 shows a housing 10 having a swirl chamber 12. The chamber 12 is provided with a tangential inlet or port 14, a radial port 16 and an axial port 18. The port 14 is connected with a control flow in a preferred embodiment.

Considering the liquid or gaseous characteristics of controlled and controlling fluids, it is known by those skilled in the art that selection of a gas for the controlling medium will inject at a much higher velocity than a liquid (under reasonable pressure), and thus induce a higher velocity vortex, whether the controlled medium be a liquid or a gas. However, this does not preclude the use of a liquid as a controlling medium as will be seen by a glance at test results incorporated hereinafter.

As for the ports 16 and 18, they are connected in a liquid or gaseous flow system so that the magnitude of the vortex created by flow into said chamber 12 through port 14 will control flow into the chamber 12 and out the port 18.

In more detail, the operation of chamber 12 is as follows: When the control flow is shut off, as by a valve 20, fluid enters the swirl chamber 12 through the inlet port 16 and leaves through the outlet port 18 with little or no restriction. However, when the control valve 20 is opened, a vortex (see arrows 22) is induced in the swirl chamber 12. This creates a centrifugal force or pressure which opposes the main inlet pressure at port 16, thus reducing or stopping the main flow.

It should be noted that this main flow could be injected into the periphery of the swirl chamber in an axial direction rather than a radial direction as shown. The only limitation on such an inlet location is that it must be placed in such a fashion as to be in the vortex flow path.

Several tests have been run on several models of the subject device using a gas to control a gas, a liquid to control a liquid and a gas to control a liquid; said tests have shown the following preliminary results:

Main air flow (outlet) was decreased by a factor of ten, when the swirl chamber was exposed to controlling air pressure 1.7 times main supply pressure, and the swirl chamber was found sensitive to the ratio of chamber diameter to outlet as well as to discharge pressure.

Control of a liquid main flow was obtained by injecting either air or liquid to induce swirl.

Rather than utilizing a mechanical valve to reduce gaseous control flow through orifice 14 and permit main flow, similar results were obtained in tests by injecting water in the control flow air stream, said water injection reducing the vortex velocity in the swirl chamber. Such an injection may be by any known means with regard to the state of art for such devices.

In another embodiment of this invention, as seen by FIGURE 2, it is possible to increase the range of control of the vortex valve by connecting two or more of the swirl chambers 10 in series. This also could reduce the weight and size of the device for a given flow range.

In more detail two swirl chambers are shown by FIGURE 2 to be interconnected so that the outlet 18a is connected by a conduit 24 to the inlet 16b of the housing 12b. The main flow to be controlled enters housing 12a through inlet 16a and exits from port 18b of housing 12b.

With regard to controlling the series connected swirl chambers of FIGURE 2, the tangential openings 14a and 14b are connected by conduit 26 which in turn is in communication with a valve 20a. Thus, as the valve 20a is opened or closed the vortices in both housing 12a and 12b are increased or decreased to control flow from the inlet 16a through the outlet port 18b. The same control source may be used for each swirl chamber, since the downstream chamber housing 12b would require no higher control pressure than the upstream chamber housing 12a.

As is shown by FIGURE 2A the combined swirl chambers of FIGURE 2 may be controlled in yet another manner where swirl chamber 12a is controlled by a flow entering tangential opening 14a, which flow is controlled by a flow regulation device such as the valve 20a shown or by the liquid injection mentioned. However, instead of conduit 26 diverting the control flow between chambers 12a and 12b to control both chambers, I have found that a simple pressure bleed 25 into the vortex flow of chamber 12a provides adequate vortex flow for chamber 12b when connected to tangential opening 14b as by conduit 27.

A still further embodiment of the present invention is shown by FIGURE 3 wherein a swirl chamber housing 12c has its outlet port 18c connected by conduit 28 to the tangential port 14d of a swirl chamber housing 12d. Thus, the main flow swirl chamber, comprising housing 12d with a main flow inlet 16d, an axially placed outlet 18d and a tangential inlet 14d, is controlled by a small auxiliary flow chamber, comprising a housing 12c, an auxiliary flow inlet 16c, an axially placed outlet port 18c and a tangential inlet 14c. The auxiliary flow chamber, as seen in FIGURE 3, is controlled by a valve 20b as in previous embodiments.

The advantages of such a system, as depicted by FIGURE 3, can best be described by noting that the object of the swirl chamber is to replace a mechanical metering valve by a smaller one which may handle a smaller flow of more compatible fluid. For example, instead of metering a high flow of very hot gas by means of a mechanical valve, it is more advantageous to meter such a flow by a vortex flow as presented by this device which vortex flow may in turn be controlled mechanically or otherwise as mentioned above. This also simplifies the control by metering a smaller quantity of a cooler gas to control a high pressure, high temperature flow or the like.

As for FIGURES 4 and 5, they relate to possible applications of the vortex valving aforedescribed to thrust vector control utilizing a hot gas injection.

It is, however, to be readily understood that such a device as presented by this invention could be utilized in many applications. As for the following rocket application, it is herein detailed for the simplicity it affords in describing my invention.

In more detail, and with particular reference to FIGURE 4, a rocket combustion chamber 30 is shown having a nozzle 32 thereto attached in such a manner as to form a throat 34 therebetween. A vortex or swirl chamber 36 is provided in the nozzle wall structure. This chamber 36 is provided, according to the present invention, with an axial outlet port 38, a radial inlet main flow port 40 and a tangential inlet control flow port 42.

The inlet port 40 is connected by a bleed passage 44 to an area adjacent the throat 34; whereas the inlet port 42 is connected by a conduit 46 to the high pressure region of the combustion chamber 30. Thus the gases in conduit 46 are of a higher pressure than those in the bleed passage 44 whereby a controlling vortex can be created upon opening of a mechanical valve 48. As the vortex is increased or decreased, a thrust vectoring flow, which produces a shock wave for effective thrust vector deflection, is decreased or increased from the outlet 38.

FIGURE 5 relates to a modification of the vortex valve design of FIGURE 4 wherein the mechanical valve 48a is controlling a smaller quantity of a cooler gas from tank 50 which is at a higher pressure than combustion gases, to control the flow of a high pressure, high temperature gas from the combustion chamber 30a that is conducted to the vortex or swirl chamber 36a by a passageway 52, said gas being exhausted from chamber 36a through a conduit 54 to the control inlet of a larger vortex or swirl chamber 36b which also has a gaseous main flow conducted from the rocket nozzle throat area 34a where the pressure of the gas is reduced over that in the combustion chamber, said gases being directed to said chamber by a passageway 56.

In operation the vortex valve system of FIGURE 5 controls a gaseous injection into a jet nozzle 58 to produce a shock wave as before by increasing or decreasing flow from the chamber 36a to decrease or increase, respectively, the flow from chamber 36b.

As many changes in and modifications of the specific exemplary form of the invention herein disclosed can be made while employing the invention and obtaining the benefit of its advantages, it is to be understood that the scope of the invention is to be ascertained solely from the appended claims.

I claim:
1. A fluid flow control device comprising:
   a housing defining a circular swirl chamber having an axial opening through which a pressurized control fluid is discharged,
   a first inlet port formed in said housing through which said pressurized control fluid is injected radially inwardly into said swirl chamber, and
   a second inlet port formed in said housing at a point in said swirl chamber circumferentially disposed at least ninety degrees from said first inlet port and through which a pressurized fluid is injected tangentially into said swirl chamber thereby establishing a vortex flow,
   said flow of pressurized control fluid injected by said first inlet port being intercepted by said vortex flow which opposes the flow from said first inlet port to effect a corresponding control of flow of said pressurized control fluid through said axial opening.

2. A fluid flow control device comprising:
   a housing defining a circular swirl chamber having an axial opening through which a pressurized control fluid is discharged,
   a first inlet port formed in said housing at a point in said swirl chamber diametrically opposite said first inlet port and through which said pressurized control fluid is injected radially inwardly into said swirl chamber,
   a second inlet port formed in said housing through which a pressurized fluid is injected tangentially into said swirl chamber thereby establishing vortex flow,
   said flow of pressurized fluid injected by said first inlet port being intercepted by said vortex flow which opposes the flow from said first inlet port to effect corresponding control of said pressurized control fluid through said axial opening, and
   flow control means operatively connected to said second inlet port for controlling the fluid flow therethrough and thus the vortex flow in said swirl chamber.

3. A fluid flow control device as claimed in claim 1 wherein the pressurized fluid supplied to said second inlet port is at a higher pressure than the said pressurized control fluid supplied to said first inlet port.

4. A fluid flow control device comprising:
   a housing defining first and second circular swirl chambers each of which is provided with an axial opening through which a pressurized control fluid is discharged,
   a first inlet port formed in said housing through which said pressurized control fluid is injected radially inwardly into said first swirl chamber,
   a second inlet port formed in said housing connected to receive the pressurized control fluid discharged from the axial opening of said first swirl chamber and inject the same radially inwardly into said second swirl chamber,
   third and fourth inlet ports formed in said housing through which a pressurized fluid is injected tangentially into said first and second swirl chambers, respectively, to establish vortex flow therein,
   said third and fourth inlet ports being located at a point in said first and second swirl chambers, respectively, circumferentially disposed at least ninety degrees from their respective first and second inlet ports, and
   flow control means operatively connected to said third and fourth inlet ports for controlling the flow of pressurized fluid therethrough to vary the vortex flow in said first and second swirl chambers accordingly,
   said flow of pressurized control fluid injected by said first inlet port being intercepted by the vortex flow in said first swirl chamber which opposes the flow of said injected fluid to effect a decrease in flow thereof through said axial opennig to said second inlet port,
   said flow of pressurized control fluid injected by said second inlet port being intercepted by the vortex flow in said second swirl chamber which opposes the flow of injected fluid to effect a decrease in flow through said axial opening associated with said second swirl chamber.

5. A fluid flow control device as claimed in claim 4 wherein the axis of each of said axial openings and the axis of the swirl chamber associated therewith are colinear.

6. A fluid flow control device as claimed in claim 4 wherein the axis of said first swirl chamber is substantially at a right angle to the axis of said second swirl chamber.

7. A fluid flow control device comprising:
   a housing defining first and second swirl chambers each of which is provided with an axial opening,
   first and second fluid inlet ports communicating with said first and second swirl chambers, respectively, through which a first pressurized fluid is injected radially inwardly into said chambers, a third fluid inlet port communicating with said first swirl chamber at a point in said first swirl chamber circumferentially disposed at least ninety degrees from said first fluid inlet port and through which a second pressurized fluid is injected tangentially into said first chamber thereby establishing a vortex flow therein, a fourth fluid inlet port communicating said second swirl chamber with said axial opening of said first swirl chamber through which said first pressurized fluid is injected tangentially into said second swirl chamber thereby establishing a vortex flow therein, and flow control means operatively connected to said third fluid inlet port for controlling the flow of said second pressurized fluid supplied thereto and thus the vortex flow in said first swirl chamber, said flow of first pressurized fluid injected into said first swirl chamber by said first fluid inlet port being intercepted by said vortex flow in said first chamber which opposes the flow of said first pressurized fluid into said first swirl chamber to effect corresponding control of the flow of first pressurized fluid discharged through said first swirl chamber axial opening, said flow of first pressurized fluid injected into said second swirl chamber by said second fluid inlet port being intercepted by said vortex flow derived from the controlled first pressurized fluid and injected by said fourth fluid inlet port which opposes the flow of said pressurized fluid into said second swirl chamber to effect corresponding control of the flow of first pressurized fluid discharged through said second swirl chamber axial opening.

8. A device for controlling fluid flow through a nozzle thrust vector injector of a rocket engine provided with a combustion chamber and a converging diverging thrust nozzle comprising:

a housing defining a circular swirl chamber having an axial opening connected to supply gaseous products of combustion to the thrust vector injector, a first inlet port formed in said housing through which gaseous products of combustion derived from the combustion chamber are injected radially inwardly into said swirl chamber, a first conduit connected to the diverging portion of the thrust nozzle adjacent the throat portion thereof and said first inlet port for venting a portion of the gaseous products of combustion flowing through the thrust nozzle at a reduced pressure to said first inlet port, a second inlet port formed in said housing at a point in said swirl chamber circumferentially disposed at least ninety degrees from said first inlet port and through which gaseous products of combustion derived from the combustion chamber are injected tangentially into said swirl chamber to form a vortex flow therein, a second conduit connected to supply gaseous products of combustion from the combustion chamber to said second inlet port, and valve means operatively connected to said second conduit for controlling flow therethrough, said flow of gaseous products of combustion injected by said first inlet port into said swirl chamber being intercepted by said vortex flow which opposes the flow thereof to effect corresponding control of the flow of gaseous products of combustion through said axial opening to said thrust vector injector.

References Cited by the Examiner

UNITED STATES PATENTS

| | | | |
|---|---|---|---|
| 2,575,240 | 11/51 | Thompson | 137—608 |
| 2,819,423 | 1/58 | Clark | 60—35.5 |
| 2,849,013 | 8/58 | Callender | 137—608 |
| 2,916,873 | 12/59 | Walker | 60—35.54 |
| 2,952,123 | 9/60 | Rich | 60—35.54 |
| 3,036,430 | 5/62 | Eggers et al. | 60—35.54 |
| 3,075,227 | 1/63 | Bowles | 15—346 |

FOREIGN PATENTS

| | | |
|---|---|---|
| 1,278,782 | 11/61 | France. |
| 731,290 | 6/55 | Great Britain. |
| 463,352 | 4/51 | Italy. |

OTHER REFERENCES

Missiles and Spaceflight, In Flight magazine, page 42, January 13, 1961.

Publication Science and Mechanics Magazine, June 1960, vol. 31, No. 3, pages 81 and 84 relied on.

Dexter, E. M.: "Vortex Valve Development," General Electric Laboratory Report, as presented to Society of Automotive Engineers, April 17, 1961 (page 4 and Fig. 4 relied on).

SAMUEL LEVINE, *Primary Examiner.*

ABRAM BLUM, *Examiner.*

Notice of Adverse Decision in Interference

In Interference No. 95,341 involving Patent No. 3,195,303, G. M. Widell, VORTEX VALVE, final judgment adverse to the patentee was rendered Aug. 8, 1966, as to claims 1, 2 and 3.

[*Official Gazette December 13, 1966.*]